UNITED STATES PATENT OFFICE 2,516,632

STARCH ETHERS IN ORIGINAL GRANULE FORM

Carl C. Kesler and Erling T. Hjermstad, Cedar Rapids, Iowa, assignors to Penick & Ford, Ltd., Incorporated, Cedar Rapids, Iowa, a corporation of Delaware No Drawing. Application August 7, 1946, Serial No. 688,976

9 Claims. (Cl. 260—233.3)

This invention relates to an improved starch product in the granule form and its method of manufacture. The invention relates broadly to an improved method of reacting alkylene oxides with carbohydrates, and is more particularly concerned with the partial etherification of granule starch or modifications thereof in granule form with ethylene oxide and the improved product resulting from such reactions.

Alkylene oxides, such as ethylene oxide have been used heretofore in connection with cellulose and other carbohydrates such as starch. The amounts of the etherifying agents have been relatively large. The degree of reaction brought about a marked change in the chemical and physical properties as evidenced by cold water swelling or formation of plastic masses.

The etherification of starch and other carbohydrates with alkylene oxides is usually accomplished in strongly alkaline media or by the action of alkylene oxides on alkali carbohydrates containing at least 5% by weight of alkali, calculated as NaOH, and more often 20% by weight or more. Heretofore, useful starch hydroxy-alkyl derivatives have been produced with alkylene oxides by using sufficient alkali to swell or disperse the starch before the reaction or by treating starch in the absence of alkali with an excess of alkylene oxide producing products which have little resemblance to the original starch, either in appearance or physical properties.

It has long been the goal of starch research to make from corn starches products of commerce that would possess the properties or utility of the root starches or more recently the waxy starches. Corn starch from the usual field varieties form in many industrial concentrations rigid gels when cooled. It does not have the cohesiveness or tack necessary for many uses which will be set forth subsequently. To meet this need much time has been spent by the plant chemists and other scientists to develop the waxy varieties. Corn from China was found to contain starch with little tendency to gel or retrograde. Hybrids with the waxy characteristics are now grown and are available. These waxy varieties must be kept isolated from ordinary corn both in the growing and subsequent handling. Its production requires a substantial premium due to this separate handling and to lower yields of the more valuable constituents.

We have discovered a method of treating nonglutinous cereal starch in its original granule form to impart to it the properties possessed by root starches or the waxy varieties. Our discovery allows for the production of products which have the recognized desirable attributes of the root starches such as improved cohesiveness, little tendency to gel or retrograde, ease of enzyme modification and a lower gelatinization temperature.

We are aware that several patents have been issued covering the use of ethylene oxide as a fumigant for dry, colloidal materials, including starches and materials derived from starches. However, the processes described in these patents are carried out under conditions favoring the effective sterilization of the material without causing noticeable changes in its physical properties.

We are also aware of several patents relating to the reaction of alkylene oxides with starch or cellulose or their alkali derivatives. German Patents No. 368,413 and No. 363,192 describe the treatment of dry starch or cellulose with amounts of ethylene oxide from 10% up to 3000% by weight of starch with the production of materials which swell in water without heating, or are so drastically treated that they are plastic, swollen masses.

Schorger, in U. S. Patents No. 1,863,208, No. 1,941,277, No. 1,941,276 and No. 1,941,278, reacts alkylene oxides with the alkali derivatives of carbohydrates, particularly cellulose. He states that the ethers formed by the direct combination of ethylene oxide with starch and cellulose in the absence of alkali "have little or no commercial value because of various difficulties encountered in the process and their excessive cost."

Hagedorn, Ziese, and Reyle in U. S. Patent No. 1,876,920, cause a caustic alkali and alkylene oxides to act simultaneously on carbohydrates, the amount of caustic alkali being in the neighborhood of 20% of the weight of starch. Dreyfus, in U. S. Patents No. 2,055,892, No. 2,094,100, and No. 2,055,893, reacts alkylene oxides with cellulose containing or in the presence of not more than 10% by weight of alkali. In summary, the object of the mass of the prior art has been to produce from carbohydrates, primarily cellulose, by means of alkylene oxides, materials easily swollen in water with heat and often reacted with large amounts of alkali or ethylene oxide or both to give a plastic mass capable of being dispersed in various solvents.

An object of the present invention is to produce from cereal starches, such as corn, wheat, and rice starches, products having essentially the many desirable properties which are characteristic of root starches and waxy starches without altering the apparent granule structure of the starch or destroying the properties which make ordinary or granule starch useful.

Another object is to react ungelatinized, commercial, granule cereal starches with small amounts of alkylene oxides to produce a product of high viscosity when desired which will form a cohesive, glutinous, or "stringy" paste on being cooked thoroughly in water at elevated temperatures.

Still another object is to react commercial, ungelatinized, granule starches with small amounts of alkylene oxides to produce a product with greatly reduced retrograding tendencies and greatly reduced setback or gelling. Another object is to react ungelatinized, commercial cereal starches with alkylene oxides to produce a starch more readily modified by enzymes. Other specific objects and advantages will appear as the specification proceeds.

The broad invention relates to the production of starch hydroxy-alkyl ether derivatives which retain the original granule form of the starch with new and improved properties. Broadly, the process consists in subjecting cereal starch, such as ordinary commercial corn starch, to the action of small amounts of alkylene oxides, either in liquid or gaseous state, for a sufficient period of time to bring about a partial etherification of the starch without apparent alteration of the granule structure.

Whenever reference is made to an alkylene oxide it is intended to cover these oxides in which the oxygen is linked to two adjacent carbon hydrogen groups. In other words, we intend to cover those compounds containing the ethylene oxide structure, as illustrated by the structural formula

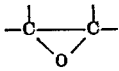

For example, 3,4 epoxy-1 butene has the structural formula

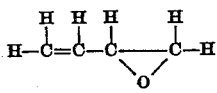

We consider this an alkylene oxide containing the ethylene oxide structure. Other examples of alkylene oxides are 1,2 epoxy propane and epichlorohydrin.

Any nonglutinous starch may be employed. Included therefore, are unmodified starches, acid modified thin-boiling starches, and substantially all of the common cereal commercial starches. We find that all of such starches, whether unmodified or partially modified, respond to the present process and bring about the new results described.

Commercial starches are available in pH ranges from slightly acid to slightly alkaline, the pH ranging from 4 to 9 or 10. The pH must be sufficiently low that the physical properties of the granules are not changed and can be readily dewatered or filtered in the process of manufacturing. Starting with a starch in its granule form and by combining directly a definite amount of ethylene oxide, we produce a product with the same granule form which has new and useful characteristics. The rate of the reaction with a given starch depends on the temperature and pressure.

The degree or extent of etherification may be varied in accordance with the desired characteristics of the finished product. We prefer that the starch react with less than 5% by weight of alkylene oxide. We have found that amounts of ethylene oxide as low as 1% by weight will greatly reduce the gelling and retrograding tendencies of certain modifications of corn starch, as for example, acid-modified thin-boiling corn starch. While we prefer that the starch react with less than 5% by weight of the alkylene oxide, satisfactory results have been obtained when the starch is reacted with a little greater than 5% of the alkylene oxide.

It is well known that unmodified cornstarch pastes above 3.5% solids concentration after cooking set up and form an opaque gel or tend to lose the ability to flow freely, especially on cooling. At the same time the phenomenon termed "retrogradation" takes place; this involves the formation in the paste of insoluble, crystalline material which will not readily redisperse on reheating in water. An unmodified cornstarch reacted with as little as 2% by weight of ethylene oxide will form a paste when cooked thoroughly that resembles the paste of waxy maize or other glutinous starches. Its paste properties parallel those of waxy maize in that it gives a red-violet color with iodine solution, has a very greatly reduced gelling tendency, increased clarity, and increased hot and cold-paste viscosities compared with the paste formed on cooking ordinary unmodified cornstarch. By combining around 5% by weight of ethylene oxide with unmodified cornstarch and then cooking this product as in ordinary commercial practice, a paste is obtained which is translucent, does not gel on cooling, and has a very glutinous, cohesive, or "long" character. The very striking resemblance of the ethylene oxide treated cornstarch to waxy maize or other glutinous starches is further illustrated by comparison of the temperature-viscosity and iodine-titration curves of ordinary unmodified cornstarch, ethylene oxide treated cornstarch, and waxy maize starch.

The alkylene oxide treated cereal starch compares very favorably with glutinous starches which are characterized by the relative absence in them of gel structure on cooling. The hot and cold paste viscosity of ordinary cornstarch is increased by the etherification with ethylene oxide considerably. When waxy maize and other glutinous starches are compared with ethylene oxide treated cornstarch by cooling the same after cooking one-half hour at 90° C. in a 4.5% concentration, it is found that the viscosity of each of these products increases rapidly until a maximum is reached, after which the viscosity decreases as the temperature is held constant at about 17° C. In contrast, ordinary cornstarch in a 4.5% concentration, on cooling increases much less rapidly in viscosity and does not reach a maximum before cooling to 17° C., and if the temperature is held at that point the viscosity will continue to increase over a considerably longer period of time. The latter effect is believed to be due to the tendency of the amylose fraction of the ordinary cornstarch to retrograde and slowly form a rigid type of gel structure, even though the paste is stirred continuously.

It is of interest also to compare ordinary cornstarch, ethylene oxide treated cornstarch, and waxy maize when titrated electrometrically with .001 N iodine solution. The method followed was the modified iodine titration method reported by Wilson, Schoch, and Hudson in the Journal of the American Chemical Society, vol. 65, pp.

1380–83 (1943). The E. M. F. of the starch-iodine solutions were measured with a Beckman potentiometer with a precision of ∓1 mv., using saturated calomel and bright platinum electrodes. The results indicate that as the amount of ethylene oxide combined with ordinary cornstarch is increased its iodine absorption characteristics approach that of waxy-maize or pure amylopectin. According to Bates, French, and Rundle, in the Journal of the American Chemical Society, vol. 65, pp. 142–148 (1943), the characteristic smooth iodine titration curves with no inflection or break, which are obtained with waxy maize, indicate the absence of amylose. The position of the point of inflection on the curve for ordinary cornstarch indicates an amylose content of about 25%. Thus the iodine titration curves we obtain with ethylene oxide treated cornstarch should indicate that the amylose fraction has been changed in some way and that it no longer has its original capacity to absorb iodine. This change is also indicated by the greatly reduced tendency of the ethylene oxide treated cornstarch to form rigid gels when pasted and cooled and by the "stringy" albuminous pastes obtained when cooked.

The process has a wide degree of flexibility. The rate of reaction may be increased by increasing the pressure of the reacting ethylene oxide gas, by raising the temperature of the reaction, or by increasing the alkalinity of the dry product without, however, producing the alkali derivative or altering the physical properties, such as granule structure of the starch, by alkali. The acidity or alkalinity of the starting material does not effect the nature of the product formed by etherification with ethylene oxide provided the alkalinity or acidity is within the range of that of ordinary commercial starches, to which reference has heretofore been made.

The moisture content of the starch has an effect on the reaction. Starches which have been dried in vacuo at 105° C. do not react readily or their reaction is too slow to be of practical use. Starches which have been vacuum dried and allowed to regain less than 3% by weight of moisture react much more slowly with ethylene oxide and gelatinize at higher temperature when cooked in water with heat and produce pastes of lower viscosity than ethylene oxide reacted starches which contain above 3% by weight of moisture. We prefer to react starches containing the normal moisture content which varies from around 5 to 15%.

The temperature and pressure employed in the process may vary widely. The reaction may be carried on at temperatures from below ordinary or room temperature up to the degradation temperature range of the starch. The pressure may be above or below that of the atmosphere.

Other alkylene oxides such as propylene oxide and 3,4 epoxy-1 butene were found to give similar characteristics to corn starch when small amounts were used. They react with the starch at a lower rate, however.

It has also been found that starches modified with ethylene oxide are reduced to a much lower viscosity by use of a definite amount of enzyme than untreated cornstarch, or to the same viscosity with approximately one-half the amount of enzyme required to liquefy untreated cornstarch. The ease of modification of these improved products with enzymes is of the order of that for liquefying tapioca or waxy maize.

The properties of the starches treated with small amounts of ethylene oxide suggests numerous industrial applications for this product. One of the serious disadvantages of cereal starches for many uses is the tendency of their pastes to set back or retrograde. The glutinous starches, such as tapioca which do not have this characteristic to such a marked degree have long been considered the best bases for the preparation of adhesives. Also, the tacky or "long" character of the pastes formed from glutinous starches has been considered a valuable property in adhesives. For many purposes, such as in veneer glues, the adhesive must possess ability to flow at relatively high concentrations. Ordinary cereal starches and many of their modifications tend to set up or gel in high concentrations, or lack the necessary flow properties. The treatment of cereal starches with ethylene oxide would improve them considerably in this respect.

In the sizing and coating of paper a starch which has a reduced gelling and retrograding tendency is usually desired. Such starches allow for greater mobility and lower yield values and higher dry substance at a viscosity suitable for commercial application.

Starches which do not retrograde or gel are very useful in the textile industry. In finishing fabrics a starch which forms a clear, transparent, film is desired. Those that retrograde are not suitable because their films are rather opaque. Textile printing pastes require starches or gums with high paste viscosity at low paste concentrations. The ethylene oxide treated starches are suitable since they may be made with extremely high paste viscosities, their pastes are easily diluted, and they have negligible gelling and retrogradation on standing. For cord polishing a starch which is slow-congealing and has a "long," stringy paste is suitable. Ordinary corn starches are not suitable because of their paste "shortness" and their gelling properties. Treatment of cornstarch with ethylene oxide gives it characteristics making it suitable for this use. Numerous other uses for a starch having the improved properties described in this patent specification should be obvious to those skilled in the art.

Specific examples of the process may be set out as follows:

*Example 1*

Unmodified cornstarch containing approximately 10% by weight of moisture and having a pH in water suspension of 6.5 is placed in a pressure tight vessel provided with means of agitation and heating. After evacuating the air from the vessel 3% by weight on the starch of ethylene oxide is introduced into the vessel and the reactants heated for 2 hours at 100° C. with agitation. The product obtained will have a gelatinization temperature very close to that of potato or tapioca starch and on cooking in water for ½ hour at 90° C. a glutinous, translucent paste will be formed which resembles that of unmodified potato starch.

*Example 2*

100 parts of dry, powdered, unmodified cornstarch containing 9.7% by weight of moisture and having a pH in water suspension of 9.5, are stirred with 3 parts by weight of liquid ethylene oxide until uniformly mixed. The mixture is placed in a pressure-tight vessel and kept at a temperature around 27° C. for 24 hours. The product obtained will have a gelatinization temperature somewhat lower than ordinary unmodified cornstarch, and on cooking for one-half hour at 90° C. a glutinous, translucent paste will be formed which gels only slightly on cooling and standing.

*Example 3*

An acid modified, thin boiling cornstarch having a moisture content of 13.4%, a pH in water suspension of 9.5, and a viscosity of 200 gram-centimeters when measured in a Corn Industries Viscosimeter, when cooked at a pH of 6.5 in a 12% solids concentration for 25 minutes with a propeller speed of 60 revolutions per minute and a final temperature of 90° C., is placed in a pressuretight vessel and the air in the vessel evacuated. Two percent by weight of ethylene oxide is introduced, the vessel is sealed and a temperature around 27° C. maintained for 12 hours. The resulting product, when cooked in a Corn Industries Viscosimeter under the conditions set forth above will have a viscosity of approximately 25 gram-centimeters. On cooling the 12% cooked paste, negligible gelling occurs and the paste will remain fluid on cooling.

*Example 4*

Unmodified wheat starch containing 10.9% moisture and having a pH in water suspension of 9.0 is placed in a pressuretight vessel provided with means of agitation and heating. After evacuating the air from the vessel, 3% by weight on the starch of ethylene oxide is introduced and the reactants agitated and heated for 2 hours at 100° C. The product obtained will have a gelatinization temperature range close to that of potato or tapioca starch and on cooking in water for ½ hour at 90° C. a glutinous, translucent paste will be formed which has negligible gelling on cooling. The hot and cold paste viscosities of the product is higher than that of untreated wheat starch.

While in the foregoing specification there have been set forth certain embodiments of the invention in great detail, it will be understood that such details may be varied widely by those skilled in the art without departing from the spirit of the invention.

We claim:

1. In a process for preparing partial ethers of granule, cereal starch by direct alkylation with alkylene oxides, the steps of bringing into contact with granule, cereal starch having from 3% to 15% moisture, from 1% to 5% by weight of an alkylene oxide in which the oxygen is linked to adjacent carbon hydrogen groups, and agitating the mixture in a closed zone until substantially no free alkylene oxide remains.

2. In a process for preparing partial ethers of granule, cereal starch by direct alkylation with ethylene oxides, the steps of bringing into contact with granule, cereal starch having from 3% to 15% moisture, from 1% to 5% by weight of an ethylene oxide in which the oxygen is linked to adjacent carbon hydrogen groups, and agitating the mixture in a closed zone until substantially no free ethylene oxide remains.

3. In a process for preparing partial ethers of granule, cereal starch by direct alkylation with propylene oxides, the steps of bringing into contact with granule, cereal starch having from 3% to 15% moisture, from 1% to 5% by weight of a propylene oxide in which the oxygen is linked to adjacent carbon hydrogen groups, and agitating the mixture in a closed zone until substantially no free propylene oxide remains.

4. In a process for preparing partial ethers of corn starch by direct alkylation with alkylene oxides, the steps of bringing into contact with the corn starch containing from 3% to 15% moisture, an alkylene oxide, in which the oxygen is linked to adjacent carbon hydrogen groups, in the proportion of from 1% to 5% by weight, and agitating the mixture until substantially no free alkylene oxide remains.

5. In a process for preparing partial ethers of granule, cereal starch by direct alkylation with alkylene oxides, the steps of bringing into contact with granule, cereal starch having from 3% to 15% moisture, from 1% to 5% by weight of an alkylene oxide in which the oxygen is linked to adjacent carbon hydrogen groups, and agitating the mixture until substantially no free alkylene oxide remains.

6. A starch product comprising a reaction product of a mono-functional epoxide of a lower aliphatic hydrocarbon in which the oxygen is linked to adjacent carbon hydrogen groups and non-glutinous cereal starch in its original unswollen granule form, said product being produced in accordance with the process set forth in claim 1.

7. A starch product comprising a reaction product of ethylene oxide and non-glutinous cereal starch in its original unswollen granule form, said product being prepared in accordance with the process of claim 2.

8. A starch product comprising a reaction product of 1,2 epoxy propane and non-glutinous cereal starch in its original unswollen granule form, said product being prepared in accordance with the process of claim 3.

9. A starch product comprising a reaction product of a mono-functional epoxide of a lower aliphatic hydrocarbon in which the oxygen is linked to adjacent carbon-hydrogen groups and cornstarch in its original unswollen granule form, said product being prepared in accordance with the process of claim 4.

CARL C. KESLER.
ERLING T. HJERMSTAD.

REFERENCES CITED

The following references are of record in the file of this patent:

UNITED STATES PATENTS

| Number | Name | Date |
|---|---|---|
| 1,863,208 | Schorger | June 14, 1932 |
| 2,116,867 | Kreimeier | May 10, 1938 |

FOREIGN PATENTS

| Number | Country | Date |
|---|---|---|
| 363,192 | Germany | Nov. 4, 1922 |
| 368,413 | Germany | Feb. 5, 1923 |